United States Patent [19]

Murata et al.

[11] Patent Number: 5,796,473
[45] Date of Patent: Aug. 18, 1998

[54] METHOD OF ADJUSTING OPTICAL AXIS OF HEADLIGHT OF VEHICLE

[75] Inventors: Nagatoshi Murata; Takeshi Masaki, both of Sayama, Japan

[73] Assignee: Honda Giken Kogyo Kabushiki Kaisha, Tokyo, Japan

[21] Appl. No.: 741,003

[22] Filed: Oct. 30, 1996

Related U.S. Application Data

[63] Continuation-in-part of Ser. No. 614,173, Mar. 8, 1996, abandoned.

[30] Foreign Application Priority Data

Mar. 20, 1995 [JP] Japan ............................ 7-61173

[51] Int. Cl.$^6$ .................................................. G01J 1/00
[52] U.S. Cl. ........................................................ 356/121
[58] Field of Search ............................... 356/121–123, 356/153, 154, 394; 348/86, 91, 92, 93, 94

[56] References Cited

U.S. PATENT DOCUMENTS

| | | |
|---|---|---|
| 4,634,275 | 1/1987 | Yoshida et al. |
| 5,373,357 | 12/1994 | Hopkins et al. |

FOREIGN PATENT DOCUMENTS

| | | |
|---|---|---|
| 458 586 | 11/1991 | European Pat. Off. |
| 57-111431 | 7/1982 | Japan. |
| 63-42444 | 2/1988 | Japan. |
| 63-63849 | 12/1988 | Japan. |
| 3-103743 | 4/1991 | Japan. |
| 4-25741 | 1/1992 | Japan. |
| 2 292 604 | 2/1996 | United Kingdom. |

*Primary Examiner*—K. Hantis
*Attorney, Agent, or Firm*—Armstrong, Westerman, Hattori, McLeland & Naughton

[57] ABSTRACT

An optical axis of a headlight of a vehicle is adjusted by picturing an illuminating pattern of the headlight to appear on a screen which is disposed in front of the vehicle. A position of a center of gravity of a region above a predetermined illuminance in the illuminating pattern is obtained. A position of a stepped region in which a stepped portion of a light/dark border line of the illuminating pattern is present is obtained. A position of a point of inflection, in the stepped region, of an iso-illuminance curve having a predetermined rate of illuminance relative to an illuminance in the center of gravity is measured. The optical axis is adjusted based on this point of inflection.

15 Claims, 3 Drawing Sheets

5,796,473

1

METHOD OF ADJUSTING OPTICAL AXIS OF HEADLIGHT OF VEHICLE

The present application is a continuation-in-part of prior U.S. patent application Ser. No. 08/614,173, filed Mar. 8, 1996 now abandoned.

BACKGROUND OF THE INVENTION

1. Field of the Invention

The present invention relates to a method of adjusting an optical axis of a headlight of a vehicle like a motor vehicle. This method is applied to a so-called Z-beam type of headlight having an illuminating pattern in the shape of a letter Z, in which a border line between a light portion and a dark portion (hereinafter also called "a light/dark border line") is made up of a relatively low horizontal portion on a laterally inner side, a relatively high horizontal portion on a laterally outer side (on the side of the road shoulder), and an intermediate stepped portion.

2. Description of the Related Art

As a method of adjusting an optical axis of a headlight, there is conventionally known one as disclosed in Japanese Published Examined Patent Application No. 9297/1990. In this method, a screen is disposed in front of a vehicle, an illuminating pattern of the headlight which appears on the screen is pictured, the position of center of gravity of a region above a predetermined illuminance is obtained by means of image processing, and the optical axis is adjusted based on the center of gravity so that the center of gravity falls within a predetermined acceptable range.

In the Z-beam type of headlight the illuminance is distributed relatively uniformly. Therefore, the position of the center of gravity of the region above a predetermined illuminance may differ or result in a discrepancy, each time the measurement is made, if repeated measurements are made with the same headlight, due to a delicate dispersion in the amount of light receiving by the image elements of a picturing device. Accordingly, it is difficult to unequivocally define the position of the center of gravity. It follows that, if this kind of center of gravity is made the basis in the adjustment of the optical axis, the accuracy in the adjustment of the optical axis cannot be secured.

SUMMARY OF THE INVENTION

In view of the above disadvantages, the present invention has an object of providing a method in which the adjustment of the optical axis of the Z-beam type of headlight can be accurately made.

In order to attain the above object, according to a first aspect of the present invention, there is provided a method of adjusting an optical axis of a headlight of a vehicle by picturing an illuminating pattern of the headlight to appear on a screen which is disposed in front of the vehicle, the adjusting being made based on an image of the illuminating pattern. The method comprises the steps of: obtaining an iso-illuminance curve in the illuminating pattern, an illuminance of each point on the iso-illuminance curve being substantially equal to a first value; obtaining a position of a stepped region of the iso-illuminance curve in which a rising portion between two portions of different levels of the iso-illuminance curve is present; measuring a position of a point of inflection in the stepped region; and adjusting the optical axis based on the point of inflection.

According to a second aspect of the present invention, there is provided a method of adjusting an optical axis of a

2 headlight of a vehicle by picturing an illuminating pattern of the headlight to appear on a screen which is disposed in front of the vehicle, the method comprising the steps of: obtaining a position of a light/dark border point in each position in a horizontal direction of the illuminating pattern based on an illuminance distribution in a vertical direction; wherein a region in which an amount of displacement in the vertical direction of the light/dark border point per unit length in the horizontal direction is above a predetermined value is defined to be a stepped region in which a stepped portion of a light/dark border line of the illuminating pattern is present; and obtaining a position of a maximum displacement point in which the amount of displacement in the stepped region becomes maximum; wherein the adjustment of the optical axis is made based on the maximum displacement point.

By appropriately setting the rate of illuminance of the iso-illuminance curve to the illuminance in a position of a center of gravity in a region above the predetermined illuminance, the iso-illuminance curve almost approximates to the light/dark border line that can be recognized by the naked eye. Even if the position of the center of gravity is discrepant or differs, the illuminance in the position of the center of gravity is constant. Therefore, the iso-illuminance curve does not result in discrepancy irrespective of repeated measurements made with the same headlight.

The shape of the iso-illuminance curve in the illuminating pattern on the image becomes a cross-sectional shape at a relatively low illuminance in the illuminance distribution on the screen when the lens opening of a picturing means such as a camera is small, and becomes a cross-sectional shape at a relatively high illuminance in the illuminance distribution on the screen when the lens opening of the camera is small. The shape of the iso-illuminance curve, therefore, varies with the change in the lens opening of the camera. If the lens opening is adjusted such that an area of a region above a predetermined illuminance becomes a predetermined value, there will be established an unambiguous relationship between the illuminance on the image and the illuminance on the screen. By appropriately setting the rate of illuminance of the iso-illuminance curve to the above-described predetermined illuminance, the iso-illuminance curve almost approximates to the light/dark border line that can be recognized by the naked eye. And, the iso-illuminance curve does not deviate in position even if repeated measurements are made with the same headlight.

Here, in the case of a Z-beam type of headlight, if the position of the stepped portion in the light/dark border line deviates in a laterally inner direction or if the level of the horizontal portion becomes high, it will give a dazzling to a driver in a vehicle running in the opposite direction. If the horizontal portion becomes high, the position of the stepped portion also becomes high. Therefore, if the optical axis is adjusted such that the stepped portion falls within predetermined ranges in the horizontal direction and in the vertical direction, an appropriate forward lighting can be made without causing a dazzling to the driver in the vehicle running in the opposite direction.

Further, the point of inflection of the iso-illuminance curve in the stepped region in which the stepped portion is present becomes a point to unambiguously define the position of the stepped portion. Therefore, as in the first aspect of the present invention, by making the point of inflection to be a basis in the adjustment of the optical axis, the optical axis of the Z-beam type of headlight can be accurately adjusted.

In addition, as in the second aspect of the present invention, if the position of the light/dark border point in each position in the horizontal direction is obtained, the line connecting these light/dark border points becomes a light/dark border line of the illuminating pattern. The region in which the amount of displacement in the vertical direction of the light/dark border point per unit length in the horizontal direction is above a predetermined value or more becomes a portion in which the light/dark border line inclines in the vertical direction, i.e., the stepped region in which the stepped portion is present. The point of a maximum displacement in which the amount of displacement in the stepped region becomes maximum will be a point to correspond to the above-described point of inflection. Therefore, the optical axis of the Z-beam type of headlight can also be accurately adjusted by making the maximum displacement point as the basis in the adjustment of the optical axis.

There are, however, headlights in which the positional relationship in the vertical direction between the above-described point of inflection or the maximum displacement point and the horizontal portion of the light/dark border line disperses. In such a case, there is obtained an equation of a horizontal line which is approximate to an iso-illuminance curve in a horizontal region in which a horizontal portion of the light/dark border line of the illuminating pattern is present, to thereby make the horizontal line a basis of the adjustment of the optical axis in the vertical direction, and the point of inflection or the maximum displacement point is made a basis of the adjustment of the optical axis in the horizontal direction. Then, the optical axis can accurately be adjusted even if the positional relationship in the vertical direction between the above-described point of inflection or the maximum displacement point and the horizontal portion of the light/dark border line disperses.

Further, in the Z-beam type of headlight in general, there exists a correlation between the position of the center of gravity of a region above a predetermined illuminance and the position of the above-described stepped region or the horizontal region. Therefore, the position of the stepped region or the horizontal region can be obtained from the position of the center of gravity. With the headlight in which this correlation is not clear, the following step may be employed. Namely, based on the amount of displacement in the vertical direction of the light/dark border point per unit length in the horizontal direction as described above, the region in which this amount of displacement is above a predetermined value is defined to be the stepped portion, and the region in which it is below the predetermined value is defined to be the horizontal region. Then, the position of the above-described point of inflection in the stepped region or the position of maximum displacement point is obtained and the equation of the horizontal line in the horizontal region is obtained.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF PREFERRED EMBODIMENTS

Figure 1:
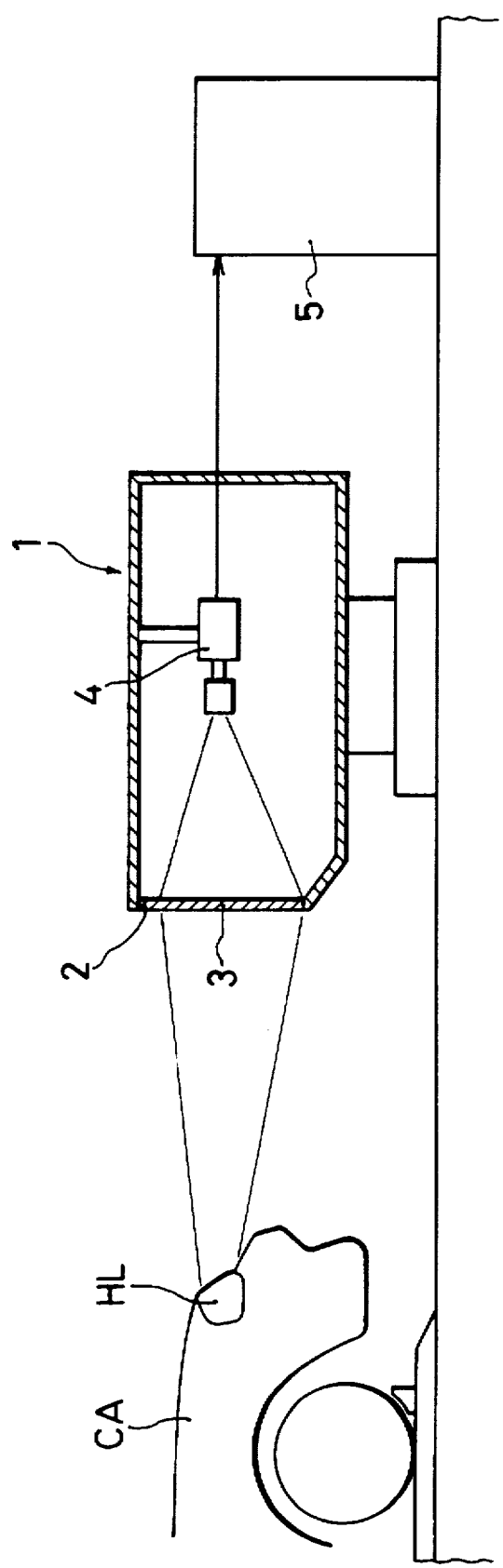
FIG. 1 is a general sectional view of an example of an optical axis measuring apparatus to be used in carrying out the method of the present invention.

In FIG. 1, reference numeral 1 denotes a main body of a measuring apparatus for measuring the orientation or the direction of the optical axis. This measuring apparatus is disposed above 3 meters in front of a headlight HL of a motor vehicle CA which is stopped or parked in a fixed position. The method of the present invention is carried out with this measuring apparatus. The main body 1 is a box member having an opening 2 in a plane which faces the headlight HL. The opening 2 is covered by a translucent (i.e., semitransparent) screen 3 which is made of a piece of ground glass or the like. The light beam of the headlight HL is radiated or thrown on the translucent screen 3 and the illuminating pattern thereof is pictured by a CCD (Charge-Coupled Device) camera 4 which is mounted inside the main body 1. The pictured image data are transmitted to an image processing device 5 and an image processing to be described hereinbelow is performed.

Figure 2:
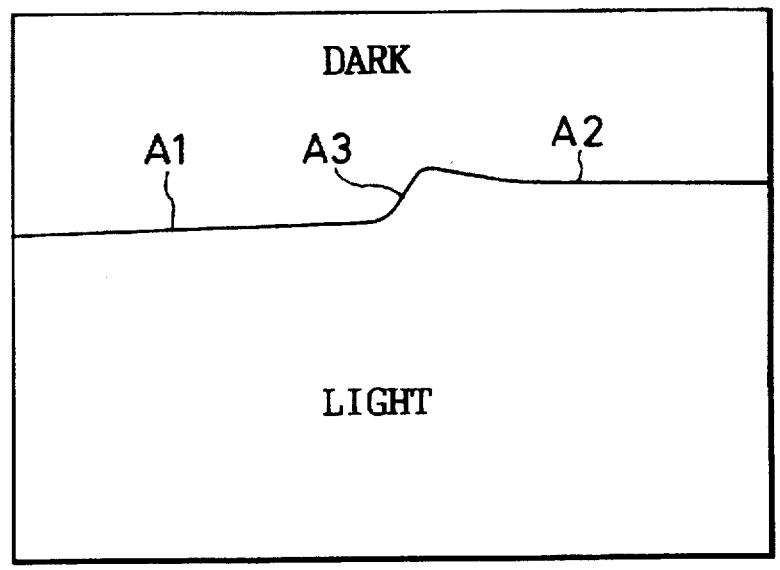
FIG. 2 is a diagram showing an illuminating pattern of the headlight.

Regarding the details of the image processing in the image processing device 5, an explanation will now be made with reference to FIG. 2 which shows an illuminating pattern using a Z-beam type of headlight as the headlight HL. As shown in FIG. 2, a light/dark border line which appears in the illuminating pattern of the headlight HL is, in the case of the Z-beam type of headlight, approximately Z-shaped having a relatively low horizontal portion A1 on a laterally inner side, a relatively high horizontal portion A2 on a laterally outer side (i.e., on the side of a road shoulder), and an intermediate stepped portion A3.

Figure 3:
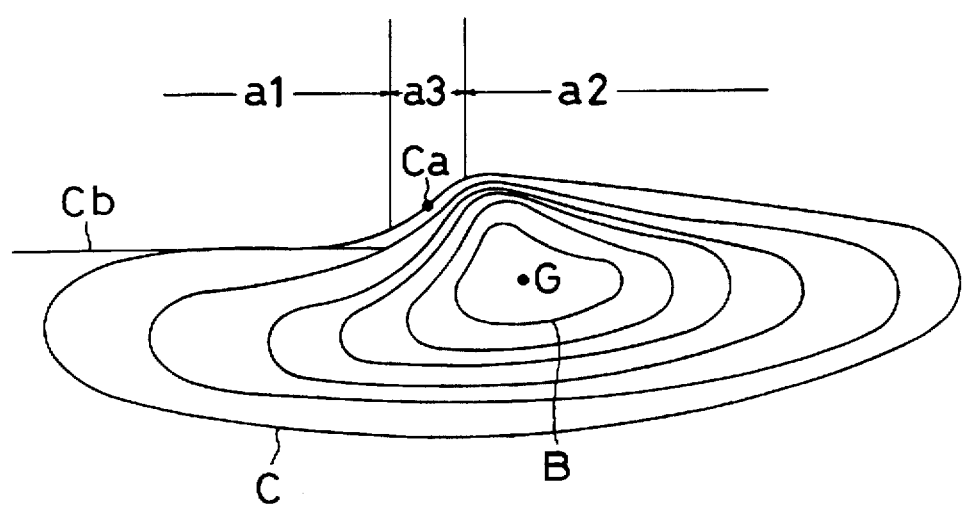
FIG. 3 is a diagram explaining an example of measuring the optical axis according to the present invention.

In carrying out the adjustment of the optical axis, the lens opening of the camera 4 is first adjusted so that the area of a region above a predetermined illuminance in the image of the illuminating pattern becomes a predetermined value, and then the position of the center of gravity G of the region B above the predetermined illuminance is measured as shown in FIG. 3. In this case, there is a possibility that the position of the center of gravity G may differ or result in discrepancy each time the measurement is made. However, the illuminance is constant or fixed within the range of variation of the position of the center of gravity G. The ratio between this illuminance and that illuminance at the light/dark border line which is confirmed or recognized by the naked eye is also constant. Therefore, if an iso-illuminance curve C which has a predetermined rate of illuminance corresponding to the above-described ratio is obtained relative to the illuminance of the center of gravity G, this curve C approximates to the light/dark border line. Further, by adjusting the lens opening of the camera as described above, there will be established an unambiguous relationship between the illuminance on the image and the illuminance on the screen 3. Therefore, the above-described curve C may also be obtained as an iso-illuminance curve which has a predetermined rate of illuminance to the above-described predetermined illuminance.

Approximate positions of a stepped region a3 in which the stepped portion A3 of the light/dark border line is present and of horizontal regions a1, a2 in which the horizontal portions A1, A2 are present, can be computed from the position of the center of gravity G based on a predetermined correlation. Then, there is obtained the position of the point of inflection Ca of the iso-illuminance curve C in the stepped region a3 which is computed from the position of the center of gravity G. Further, by means of the method of least squares or the like, there is obtained an equation of a horizontal line Cb which is approximate to the iso-illuminance curve C in at least one of both the horizontal regions a1, a2, e.g., in the region a1.

Next, the optical axis of the headlight HL is adjusted with the point of inflection Ca serving as a reference or a basis in the horizontal direction in performing the adjustment of the optical axis and with the horizontal line Cb as the basis in the vertical direction in performing the adjustment of the optical axis. In other words, the optical axis is adjusted in the horizontal direction so that a horizontal coordinate of the point of inflection Ca falls within a predetermined acceptable range in the horizontal direction, and the optical axis is also adjusted in the vertical direction so that the horizontal line Cb falls within a predetermined acceptable range in the vertical direction. According to these operations, the optical axis of the headlight HL can be accurately adjusted such that the horizontal portions A1, A2 of the light/dark border line become respective predetermined heights and that the stepped portion A3 falls within a predetermined position in the lateral direction.

Figure 4:
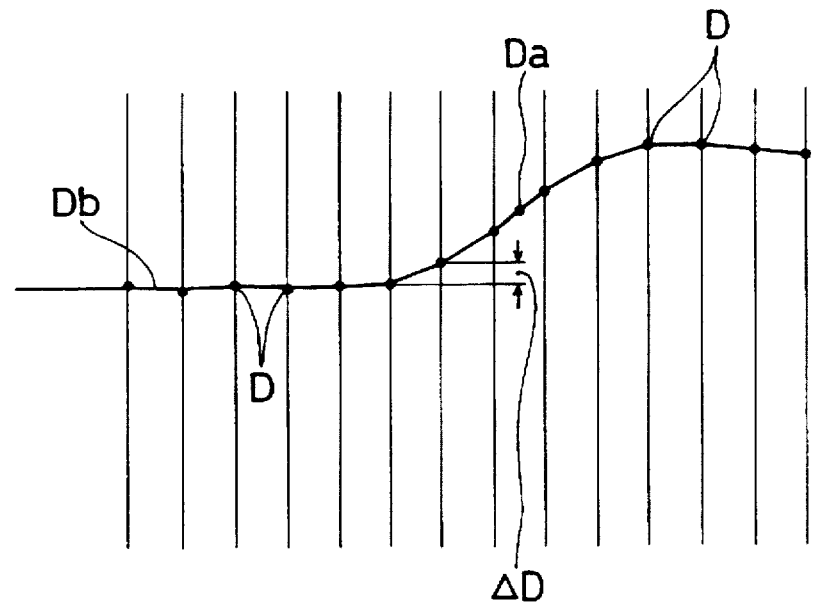
FIG. 4 is a diagram explaining another example of measuring the optical axis according to the present invention.

An explanation has so far been made about an example of adjusting the optical axis based on the iso-luminance curve C. The following method is also possible as shown in FIG. 4. Namely, a border point D between a light portion and a dark portion (also called "a light/dark border point D") in each position in the horizontal direction is obtained from the illuminance distribution in the vertical direction. The adjustment of the optical axis is then made based on these light/dark border points D.

In more detail, the line connecting the light/dark border point D in each position in the horizontal direction approximately coincides with a light/dark border line that can be recognized by the naked eye. The amount of displacement $\Delta D$ of the light/dark border point D in the vertical direction per unit length in the horizontal direction is above a predetermined value in the stepped region a3. Therefore, if the position of a maximum displacement point Da, where the amount of displacement $\Delta D$ becomes maximum, is obtained in the region where the amount of displacement $\Delta D$ is above the predetermined value, this point Da coincides with the point of inflection Ca in the stepped region a3. Further, by means of the method of least squares or the like, there is obtained an equation of a horizontal line Db which is approximate to the line connecting the light/dark points D in at least one of the horizontal regions a1 and a2, e.g., in the region a1 where the amount of displacement $\Delta D$ is below a predetermined value which is set equal to or less than the predetermined value for determining the stepped region. This horizontal line Db then coincides with the horizontal portion A1 of the light/dark border line. In this manner, the optical axis of the headlight HL can be accurately adjusted with the horizontal line Db serving as a basis in the vertical direction in the adjustment of the optical axis and with the maximum displacement point Da serving as the basis in the horizontal direction in performing the adjustment of the optical axis.

If the positional relationship in the vertical direction between the point of inflection Ca or the maximum displacement point Da and the horizontal portions A1, A2 is known and does not disperse, the adjustment of the optical axis of the headlight HL may also be made with the point of inflection Ca or the maximum displacement point Da serving as the bases in the horizontal direction and in the vertical direction in performing the adjustment of the optical axis.

When the adjustment of the optical axis is made based on the iso-illuminance curve C, there may be cases where the correlation between the position of the center of gravity G and the position of the stepped region a3 or the horizontal regions a1, a2 is unclear or is subject to dispersions. In such a case, the position of the light/dark border point D in each position in the horizontal direction is obtained, and the position of the stepped region a3 or the horizontal regions a1, a2 is then computed based on the magnitude (i.e., whether large or small) of the amount of displacement $\Delta D$ in the light/dark border point D. In this case, the following steps may alternatively be employed. Namely, in the horizontal region a1, there is obtained an equation not of the horizontal line Cb which is approximate to the iso-illuminance curve C but of the horizontal line Db which is approximate to the line connecting the light/dark points D. The point of inflection Ca in the iso-illuminance curve C in the stepped region a3 is made the basis in the horizontal direction in performing the adjustment of the optical axis, and the horizontal line Db is made the basis in the vertical direction in performing the adjustment of the optical axis.

Figure 5:
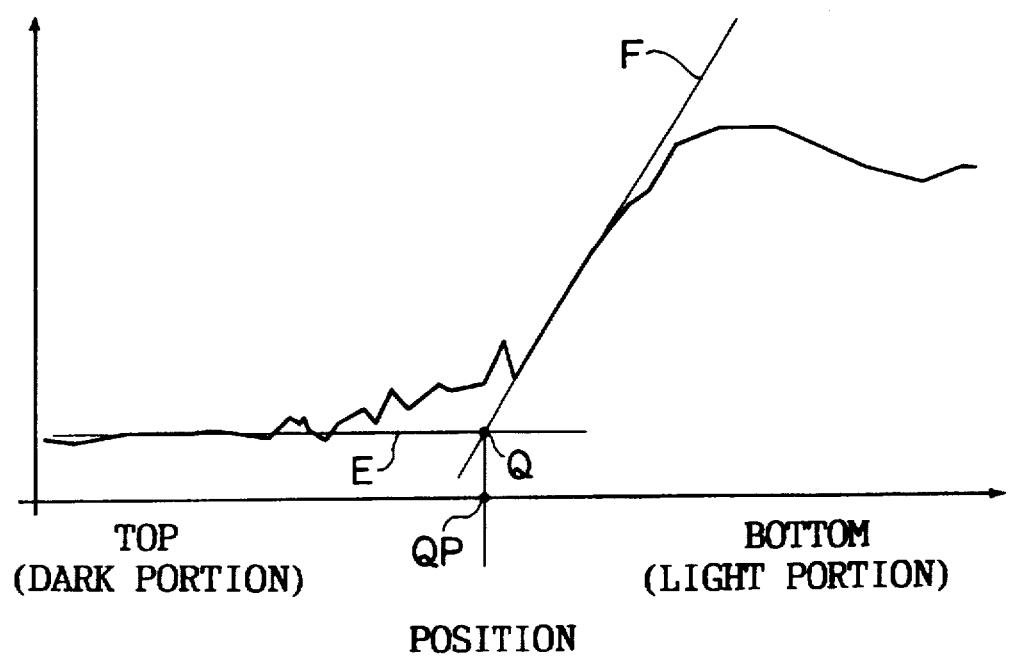
FIG. 5 is a graph showing an illuminance distribution in the vertical direction of the illuminating pattern.

By the way, an illuminance distribution curve when the illuminating pattern is scanned along a scanning line in the vertical direction is as shown in FIG. 5. There is sometimes a case where the position of the light/dark border point cannot unambiguously be defined under the influence of noises which are likely to occur in the portion bridging the dark portion and the rising portion in illuminance. In such a case, the light/dark border point can be unambiguously defined in the following manner without being influenced by the noises. Namely, an equation of a horizontal line E which is approximate to an illuminance distribution curve in the dark portion sufficiently away from the rising portion is obtained by the method of least squares or the like. An equation of a tangential line F to pass through the point of inflection of the illuminance distribution curve in the rising portion is obtained. Then, that point QP on the scanning line which corresponds to the crossing point Q of the lines E, F is defined as the light/dark border point and its position is obtained. Although the point QP does not coincide with the light/dark border point that is recognized by the naked eye, it only displaces in the vertical direction by a certain distance relative to the light/dark border point. Therefore, if an acceptable range for the adjustment of the optical axis is set by taking into account this displacement distance, the adjustment of the optical axis of the headlight HL can accurately be made.

As can be seen from the above explanations, according to the present invention, the optical axis of the Z-beam type of headlight can accurately be made.

It is readily apparent that the above-described method of adjusting an optical axis of a headlight meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A method of adjusting an optical axis of a headlight of a vehicle by picturing an illuminating pattern of the headlight to appear on a screen which is disposed in front of the vehicle, said adjusting being made based on an image of the illuminating pattern, said method comprising the steps of:

obtaining an iso-illuminance curve in the illuminating pattern, an illuminance of each point on the iso-illuminance curve being substantially equal to a first value;

obtaining a position of a stepped region of the iso-illuminance curve including two portions of different levels and a rising portion between the two portions of different levels extending in a direction different than directions in which the two portions of different levels extend;

measuring a position of a point of inflection in the stepped region; and adjusting the optical axis based on the point of inflection.

2. The method of claim 1, further comprising:

obtaining a position of a center of gravity of a region above a predetermined illuminance in the illuminating pattern; wherein a ratio of the first value to the illuminance of the center of gravity is a predetermined value.

3. The method of claim 2, wherein the position of the stepped region is obtained from the position of the center of gravity.

4. The method of claim 1, further comprising the step of adjusting a lens opening of a picturing means for picturing the illuminating pattern such that an area of a region above a predetermined illuminance becomes a predetermined value to thereby set the first value to a value having a predetermined ratio to the predetermined illuminance.

5. The method of claim 4, further comprising the step of obtaining a center of gravity of the region above the predetermined illuminance to thereby obtain the position of the stepped region from the position of the center of gravity.

6. The method of claim 1, further comprising the step of:

obtaining a position of a plurality of light/dark border points based on a plurality of illuminance distributions in vertical directions of the illuminating pattern;

wherein a region in which an amount of displacement in a vertical direction of adjacent light/dark border points per unit length in a horizontal direction is above a predetermined value is defined to be the stepped region.

7. The method of claim 1, further comprising the step of:

obtaining an equation of a horizontal line which is approximate to the iso-illuminance curve in a horizontal region in which a horizontal portion of a light/dark border line of the illuminating pattern is present;

wherein the horizontal line is made a basis of the adjustment of the optical axis in a vertical direction, and wherein the point of inflection is made a basis of the adjustment of the optical axis in a horizontal direction.

8. The method of claim 1, further comprising the steps of:

obtaining a position of a plurality of light/dark border points based on a plurality of illuminance distributions in vertical directions;

wherein a region in which an amount of displacement in a vertical direction per unit length in a horizontal direction of adjacent light/dark border points is below a predetermined value is defined to be a horizontal region in which a horizontal portion of a light/dark border line of the illuminating pattern is present; and obtaining an equation of a horizontal line which is approximate to a line connecting the light/dark border points in the horizontal region;

wherein the horizontal line is made a basis of the adjustment of the optical axis in the vertical direction, and wherein the point of inflection is made a basis of the adjustment of the optical axis in the horizontal direction.

9. The method of claim 6, wherein a region in which the amount of displacement in a vertical direction of adjacent light/dark points per unit length in a horizontal direction is below a predetermined value is defined to be a horizontal region in which a horizontal portion of a light/dark border line of the illuminating pattern is present, said method further comprising the step of:

obtaining an equation of a horizontal line which is approximate to a line connecting the light/dark border points in the horizontal region;

wherein the horizontal line is made a basis of the adjustment of the optical axis in the vertical direction, and wherein the point of inflection is made a basis of the adjustment of the optical axis in the horizontal direction.

10. The method of claim 1, wherein at least one of the two portions of different levels of the iso-illuminance curve is substantially horizontal flat portion.

11. The method of claim 1, wherein the two portions of different levels of the iso-illuminance curve are substantially horizontal flat portions.

12. The method of claim 2, further comprising the step of:

obtaining an equation of a horizontal line which is approximate to the iso-illuminance curve in a horizontal region in which a horizontal portion of a light/dark border line of the illuminating pattern is present;

wherein the horizontal line is made a basis of the adjustment of the optical axis in a vertical direction, and wherein the point of inflection is made a basis of the adjustment of the optical axis in the horizontal direction.

13. The method of claim 1, wherein the two portions of different levels are relatively horizontal portions with respect to the rising portion.

14. A method of adjusting an optical axis of a headlight of a vehicle by picturing an illuminating pattern of the headlight to appear on a screen which is disposed in front of the vehicle, said adjusting being made based on an image of the illuminating pattern, said method comprising the steps of:

obtaining a position of a plurality of light/dark border points based on a plurality of illuminating distributions in vertical directions of the illuminating pattern;

defining a stepped region, in which a stepped portion of a light/dark border line of the illuminating pattern is present, by determining a region in which an amount of displacement in a vertical direction of the light/dark border line per unit length in a horizontal direction is above a predetermined value; and obtaining a position of a maximum displacement point in which a amount of displacement in the stepped region becomes maximum;

wherein the adjustment of the optical axis is made based on the maximum displacement point.

15. The method of claim 14, wherein a region in which the amount of displacement is below a predetermined value is defined to be a horizontal region in which a horizontal portion of the light/dark border line of the illuminating pattern is present, said method further comprising the step of:

obtaining an equation of a horizontal line which is approximate to a line connecting the light/dark border points in the horizontal region;

wherein the horizontal line is made a basis of the adjustment of the optical axis in the vertical direction, and wherein the maximum displacement point is made a basis of the adjustment of the optical axis in the horizontal direction.

* * * * *